United States Patent
Bateman

(10) Patent No.: US 10,711,143 B1
(45) Date of Patent: Jul. 14, 2020

(54) POLYISOBUTYLENE AS A LIQUID COLOR CONCENTRATE COMPONENT

(71) Applicant: ColorMatrix Holdings, Inc., Berea, OH (US)

(72) Inventor: Jason Bateman, Painesville, OH (US)

(73) Assignee: ColorMatrix Holdings, Inc., Berea, OH (US)

( * ) Notice: Subject to any disclaimer, the term of this patent is extended or adjusted under 35 U.S.C. 154(b) by 104 days.

(21) Appl. No.: 15/920,068

(22) Filed: Mar. 13, 2018

Related U.S. Application Data

(60) Provisional application No. 62/475,022, filed on Mar. 22, 2017.

(51) Int. Cl.
| | |
|---|---|
| *C08L 23/22* | (2006.01) |
| *C08J 3/20* | (2006.01) |
| *C08J 3/22* | (2006.01) |
| *C09D 11/36* | (2014.01) |
| *C09D 123/22* | (2006.01) |
| *C09D 5/02* | (2006.01) |
| *C08F 10/10* | (2006.01) |
| *C08L 23/20* | (2006.01) |

(52) U.S. Cl.
CPC .............. *C09D 5/027* (2013.01); *C08F 10/10* (2013.01); *C08L 23/20* (2013.01); *C08F 2500/02* (2013.01); *C08F 2500/17* (2013.01); *C08J 3/20* (2013.01); *C08J 3/203* (2013.01); *C08J 3/22* (2013.01); *C08J 3/226* (2013.01); *C08L 23/22* (2013.01); *C08L 2310/00* (2013.01); *C09D 11/36* (2013.01); *C09D 123/22* (2013.01)

(58) Field of Classification Search
CPC ....... C08J 2423/18–22; C08J 3/20–226; C08L 2310/00; C09D 11/36
See application file for complete search history.

(56) References Cited

U.S. PATENT DOCUMENTS

| | | | | |
|---|---|---|---|---|
| 3,463,755 | A | * | 8/1969 | Forrester .................. C08J 3/215 523/332 |
| 4,571,416 | A | * | 2/1986 | Jarzombek ............... C08J 3/226 524/474 |
| 4,624,983 | A | | 11/1986 | Jarzombek et al. |
| 5,308,395 | A | | 5/1994 | Burditt et al. |
| 5,973,064 | A | * | 10/1999 | Zhao ....................... C08L 67/02 264/143 |
| 6,719,453 | B2 | | 4/2004 | Cosman et al. |
| 2010/0089289 | A1 | | 4/2010 | Mahiat et al. |
| 2015/0020713 | A1 | | 1/2015 | Maguire |

FOREIGN PATENT DOCUMENTS

EP        0603605 A1    6/1994

OTHER PUBLICATIONS

Flick, E. W. "Industrial Surfactants". 2 ed. Park Ridge, NJ: Noyes Publications, 1993. (Year: 1993).*
UL Prospector webpage for Indopol H-1900. Retrieved from www.ulprospector.com on Sep. 21, 2019. (Year: 2019).*
LyondellBasell, "A Guide to Polyolefin Blow Molding". Retrieved from web.archive.org on Sep. 21, 2019. Archive date Apr. 21, 2016. (Year: 2016).*

* cited by examiner

*Primary Examiner* — Richard A Huhn
(74) *Attorney, Agent, or Firm* — John H. Hornickel; Michael J. Sambrook

(57) ABSTRACT

Use of polyisobutylene in a weight average molecular weight of greater than 1000 daltons can increase processing efficiency when making liquid color concentrates and can improve coloration of polymers used in a variety of final shaped polymer articles.

5 Claims, No Drawings

POLYISOBUTYLENE AS A LIQUID COLOR CONCENTRATE COMPONENT

CLAIM OF PRIORITY

This application claims priority from U.S. Provisional Patent Application Ser. No. 62/475,022 and filed on Mar. 22, 2017, which is incorporated by reference.

FIELD OF THE INVENTION

This invention concerns the use of polyisobutylene (PIB) of certain molecular weight as a component in a liquid color concentrate for coloration of polymer compounds.

BACKGROUND OF THE INVENTION

Polymeric materials have a natural coloration which is not as desired as those same polymeric materials subjected to intentional coloration, usually during melt mixing of the polymer resin with a variety of functional additives.

Coloration of a polymer mixture can be performed by mixing of colorant solid masterbatch (colorant in a polymeric carrier) or by mixing of a liquid colorant dispersion (colorant in a liquid carrier) into the polymer resin.

SUMMARY OF THE INVENTION

This invention concerns unexpected improvements to how liquid colorant dispersions can be modified to provide better processing of the melt mixing before molding, thermoforming, calendering, extruding, 3D-printing or other polymeric shaping technique.

Liquid carrier solubility in the desired polymer affects both the extrusion process and the pigment dispersion.

Highly polar oils are commonly found as a component of liquid color carriers for injection molding polyolefin applications. Nonlimiting examples of these highly polar oils are dioctyl adipate, polyethylene glycols, epoxidized soybean oil, sorbitan esters (such as Span™ 20, Span™ 40, Span™ 80, and Span™ 85 (all from Croda) and well as polyethoxylated sorbitan esters (Tween™ 20, Tween™ 40, Tween™ 80 (all from Croda Inc.)).

Polar liquid carriers are slower to diffuse into the desired polymer during processing and allow for pigment and additive dispersion in the process. In a stationary single screw extrusion process, a highly polar liquid carrier can result in excessive external lubrication leading to a drop in die head pressure and extruder output. This processing deficiency is commonly called "screw slippage" by the polymer engineering industry.

While low molecular weight oils such as light mineral oils can aid in reduction of screw slippage due to their abundant compatibility with polymer resins, unfortunately formation of agglomerated pigments can result from the too-rapid absorption of the carrier into the polymer matrix. Pigment agglomeration during final polymer shaping both can affect the final part aesthetics and can decrease the color properties of strength and opacity.

Low molecular weight polyisobutylenes (PIBs) have been used in various liquid color preparations in previous work, with the weight average molecular weight (Mw) commercially used not reaching greater than 1000 daltons.

Polyisobutylene is nonpolar and therefore would be expected to have high polymer compatibility, as do the low molecular weight oils discussed above. As the molecular weight of polyisobutylene is increased, the rate of diffusion into the polymer matrix is slowed down analogous to using a lower molecular weight polar liquid carrier. Higher weight average molecular weight polyisobutylene (greater than 1000 daltons) are very viscous and in many cases are utilized as a tackifier for polymeric adhesives.

Indeed, the Brookfield viscosity of Solplus™ PB420 PIB having a Mw of 4200 daltons (Lubrizol) was measured to be 140,000 cps at room temperature using a #7 spindle and 20 rpm.

A key property of liquid carrier selection is that it should have a low viscosity to allow for high pigment loadings; high molecular weight PIBs do not qualify for the typical liquid color carrier properties on their own but have been found to be capable of blending with low viscosity carriers to create a functional blend for liquid colorant concentrate carrier which minimized screw slippage and colorant agglomeration.

The viscosity and rate of carrier absorption of the blend can be adjusted by both the type of low molecular weight diluent selection and the ratio of that diluent to the high molecular weight polyisobutylene.

In addition, the liquid diluent selection should be such that the thermal stability is sufficient to not cause fuming at the die.

EMBODIMENTS OF THE INVENTION

Example blends of polyisobutylene and several low viscosity diluents were prepared to illustrate that the viscosity of PIB can be suppressed to typical liquid color viscosities, in order to assist in minimizing screw slippage during processing and colorant agglomeration affecting coloration performance.

To exemplify the invention, Table 1 shows the materials used.

TABLE 1

| Experimental Materials |
| --- |
| Polymeric Resin: |
| Alathon ™ L5840 BMHDPE (MFR (190° C./2.16 kg) 0.35 g/10 min) (Lyondell Basell) |
| Polymeric Colorant Dispersing Agent: |
| Solplus ™ PB420 PIB (Mw ~ 4200 daltons) (Lubrizol) |
| Low Viscosity Liquid Diluent |
| Red Canola Oil (Cargill) |
| Drakeol 34 Mineral Oil (Penreco) |
| Polymeric Surfactants: |
| Solsperse ™ 21000 (Lubrizol) |
| Solsperse ™ 11000 (Lubrizol) |
| Solsperse ™ 2155 (Lubrizol) |

Table 2 demonstrates the range of Brookfield viscosities of the oil diluents alone and together with the PIB colorant dispersing agent.

TABLE 2

| Brookfield Viscosities Brookfield Viscosity in cps (sp#6 20 rpm 20° C.) | |
| --- | --- |
| Red Canola Oil | 150 |
| Drakeol 34 Mineral Oil | 450 |
| Solplus ™ PB420 PIB* | 140,000 |
| 25% Solplus ™ PB420 PIB + 75% Red Canola Oil | 350 |
| 50% Solplus ™ PB420 PIB + 50% Red Canola Oil | 7800 |
| 50% Solplus ™ PB420 PIB + 50% Drakeol 34 Mineral Oil | 19,850 |

*(sp#7 20 rpm 22° C.)

The results of Table 2 demonstrated that the low viscosity diluents of red canola oil and mineral oil commonly used as liquid colorant carriers can be affected by the very high viscosity of the PIB colorant dispersing agent in a non-linear fashion when comparing the 3:1 Oil:PIB ratio with the 1:1 Oil:PIB ratio. Moreover, the comparison in viscosities between the 1:1 Red Canola:PIB ratio and the 1:1 Mineral Oil:PIB ratio demonstrated how much more affected the mineral oil is by the use of the PIB.

The liquid carrier effect on an extrusion process was evaluated using a Cincinnati Milacron PAK200i 24:1 L/D single screw extruder equipped with a general purpose screw with mixing tip, breaker plate, and a CW Brabender 6" horizontal Flex-Lip Die Assembly.

Extruder barrel temperatures were set as a flat profile of 380° F. (193° C.) across all three heated barrel zones as well as the die.

Drakeol 34 White Mineral Oil and Red Canola Oil demonstrated much more process stability in both die head pressure (Table 3) and extruder output (Table 4) than did Tween™ 85 liquid carrier.

As between the two oil diluents, the less polar Drakeol 34 White Mineral Oil had less of an effect on the extruder processing than the more polar Red Canola Oil at the higher usage rates of 4 wt. % and 5 wt. %. In the experiments identified in Table 3, Red Canola Oil was observed on the extrudate polymer mixture when Red Canola Oil was delivered at a 4 wt. % usage rate with screw rotation of both 100 rpm and 120 rpm.

The result of the experiments of Table 3 and 4 demonstrated that oil diluents have varying degrees of compatibility with the polymer matrix and serve as a comparative baseline for further discussion of PIB blends.

TABLE 3

| Die Head Pressure (PSI) as a Function of RPM and Neat Liquid Carrier Selection | | | | | | | | | | |
|---|---|---|---|---|---|---|---|---|---|---|
| Wt. % of BMHDPE | Tween ™ 85 | Drakeol 34 White Mineral Oil | | | | | Red Canola Oil | | | |
| Additive | 0% | 0.6% | 1% | 2% | 3% | 4% | 5% | 1% | 2% | 3%* | 4% |
| 10 RPM | 820 | 0 | 800 | 850 | 810 | 820 | 750 | 780 | 760 | 770 | 780 |
| 20 RPM | 1100 | N/A | 1190 | 1130 | 1120 | 1080 | 1040 | 1100 | 1000 | 1100 | 25 |
| 50 RPM | 1650 | N/A | 1700 | 1650 | 1600 | 1550 | 1500 | 1620 | 1600 | 1600 | — |
| 100 RPM | 2100 | N/A | 2000 | 2000 | 1950 | 1970 | 1850 | 2100 | 2000 | 2050 | — |
| 120 RPM | 2200 | N/A | 2100 | 2100 | 2050 | 2000 | 1980 | 2100 | 2100 | 2050 | — |

TABLE 4

| Extruder Throughput (lbs/hr) as a Function of RPM and Neat Liquid Carrier Selection | | | | | | | | | | |
|---|---|---|---|---|---|---|---|---|---|---|
| Wt. % of BMHDPE | Tween ™ 85 | Drakeol 34 White Mineral Oil | | | | | Red Canola Oil | | | |
| Additive | 0% | 0.6% | 1% | 2% | 3% | 4% | 5% | 1% | 2% | 3% | 4% |
| 10 RPM | 26.3 | 0 | 26.12 | 26.11 | 25.97 | 26.0 | 25.4 | 26.4 | 25.5 | 25.4 | 25.1 |
| 20 RPM | 49.6 | N/A | 50.51 | 50.28 | 50.05 | 48.9 | 48.3 | 49.3 | 49.3 | 48.5 | — |
| 50 RPM | 121.2 | N/A | 123.34 | 121.84 | 121.97 | 120.5 | 120.7 | 121.8 | 120.1 | 121.3 | — |
| 100 RPM | 229.7 | N/A | 239.49 | 235.90 | 228.93 | 223.9 | 223.6 | 232.0 | 227.8 | 225.3 | — |
| 120 RPM | 270.9 | N/A | 275.87 | 270.60 | 269.87 | 269.4 | 261.7 | 274.3 | 270.7 | 262.8 | — |

Die head pressure and extruder output were monitored as an indication of over-lubrication and "screw slippage" as well as any visual liquid residue on the extrudate from the die.

The liquid carrier blends were injected by means of a peristaltic pump at various usage rates and screw RPM. The blow molding grade of high density polyethylene ("BMHDPE") chosen for the desired polymer resin was a unimodal fractional melt Alathon™ L5840 BMHDPE (Lyondell Basell).

Neat Red Canola Oil and Drakeol 34 White Mineral Oil were evaluated and compared against both a baseline of unmodified Alathon™ L5840 BMHDPE and an example of an ethoxylated liquid carrier (Tween™ 85 from Croda).

In order of polymer compatibility, the Tween™ 85 liquid carrier was found to have the least compatibility and therefore the most adverse effect on both die head pressure and extruder throughput.

As seen in Tables 3 and 4, attempts to use as little as 0.60 weight percent Tween™ 85 liquid carrier were unsuccessful because the extruder die head pressure and output decreased rapidly until output bottomed at zero.

Based on the experimental results shown in Table 2, blends of Solplus™ PB420 PIB with Red Canola Oil and with Drakeol 34 White Mineral Oil were prepared and run in a similar manner as the neat liquid carriers to assist die head pressure and extruder output at various screw rotations per minute.

Because of incompatibility and immiscibility, a blend of Tween™ 85 and PB420 was not tested.

There were several unexpected results found in the experiments of Tables 5 and 6. While the neat Red Canola Oil was not able to process above 3%, as seen in Tables 3 and 4, when blended with PIB, the Red Canola Oil processed quite well up to 4 weight percent addition to the BMHDPE. Surprisingly the 1:1 Oil:PB blend at 4 wt. % loading had nearly the head pressure of neat BMHDPE at 120 RPM, whereas at 3 wt. % 1:1 Oil:PIB blend matched the head pressure of BMHDPE also at 120 RPM.

In addition, as seen in Table 6, the extruder output increased for both oils when blended with PIB with increasing screw speeds. This output increase is a significant cost efficiency in large scale processing to add coloration to polyolefin polymers.

These results in Table 5 and Table 6 demonstrated that PIB blends can be used as liquid carriers at usage rates that are in far excess of traditional liquid color usage rates with minimal impact on processing. The blends created better process stability than the neat carriers on their own.

TABLE 5

Die Head Pressure (PSI) as a function of RPM and PIB Blends

| Wt. % of Additive | BMHDPE 0% | 50% Drakeol 34 White Mineral Oil + 50% Solplus ™ PB420 PIB | | | 50% Red Canola Oil + 50% Solplus ™ PB420 PIB | |
|---|---|---|---|---|---|---|
| | | 3% | 4% | 5% | 3% | 4% |
| 10 RPM | 820 | 800 | 820 | 700 | 770 | 780 |
| 20 RPM | 1100 | 1080 | 1100 | 950 | 1030 | 1050 |
| 50 RPM | 1650 | 1600 | 1580 | 1450 | 1550 | 1650 |
| 100 RPM | 2100 | 2100 | 2100 | 2000 | 2100 | 1950 |
| 120 RPM | 2200 | 2200 | 2250 | 2200 | 2200 | 2150 |

TABLE 6

Extruder Throughput (lbs/hr) as a function of RPM and PIB Blends

| Wt. % of Additive | BMHDPE 0% | 50% Drakeol 34 + 50% Solplus ™ PB420 PIB | | | 50% Red Canola Oil + 50% Solplus ™ PB420 PIB | |
|---|---|---|---|---|---|---|
| | | 3% | 4% | 5% | 3% | 4% |
| 10 RPM | 26.3 | 24.4 | 25.3 | 23.7 | 25.3 | 24.8 |
| 20 RPM | 49.6 | 48.0 | 46.5 | 46.2 | 47.1 | 48.0 |
| 50 RPM | 121.2 | 120.2 | 120.8 | 123.5 | 124.0 | 122.6 |
| 100 RPM | 229.7 | 248.8 | 249.8 | 251.2 | 247.5 | 239.3 |
| 120 RPM | 270.9 | 297.4 | 301.0 | 301.7 | 300.0 | 298.9 |

Pigment Yellow 191 mixtures were prepared with increasing polyisobutylene content (Examples 1-3) and one (Example 4) with a diluent change from Red Canola Oil to Drakeol 34 White Mineral Oil. The mixtures were let down into fractional melt of BMHDPE at 1.0 wt. %, extruded into 4 inch (10.16 cm) wide ribbons with the aid of a CW Brabender FSR rollstack, and compared both visually and with a spectrophotometer.

Examples 1 and 2 demonstrated that, with increasing PIB content, the opacity of the colored ribbons increases along with an increase in a* and a decrease in L*.

Those measurements agree with an apparent increase in color strength determined also by visual comparison of the extruded ribbons of Comparative Example A and Examples 1-2.

Although Example 3 had an identical concentration of PIB as Example 2, the opacity and visual strength were not as high, causing Red Canola Oil to be preferred over White Mineral Oil. Pigment agglomerates could be seen by optical microscopy of Example 3 and also Example 2 extruded ribbons, causing Example 1 to be preferred for Red Canola Oil over Example 2.

The low viscosity liquid diluent selection appeared also to have an effect on the overall colorant dispersion properties.

Phthalocyanine-based pigments are some of the most common and strongest coloration pigments by weight. In some cases, pigment strength can be increased through additional reduction of particle size by labor-intensive horizontal bead milling.

A set of Examples were prepared with various phthalocyanine-based pigments, including pigment green 7, pigment blue 15:1, pigment blue 15:3 and pigment green 15:4, with both typical Cowles mixing (HSD) and horizontal bead milling.

An increase in both opacity and color strength was observed with the use of PIB colorant dispersing agent as a liquid carrier component regardless whether the liquid color concentrate was manufactured using Cowles mixing or horizontal bead milling. The numerical details are in Tables 8-11 for Comparative Examples A-I and Examples 4-11. Each pair are direct comparisons of with and without the effect of the PIB on percent opacity and L*a*b* values (CWF), all other factors being constant.

TABLE 7

Yellow Formulations as a Function of Oil Used and Ratio of Oil/PIB

| | Pigment Yellow 191 | Solsperse ™ 2155 Surfactant | Red Canola Oil | Drakeol 34 White Mineral Oil | Solplus ™ PB420 PIB | Oil/PIB Ratio | % Opacity | L* (CWF) | a* (CWF) | b* (CWF) |
|---|---|---|---|---|---|---|---|---|---|---|
| Comp. Ex. A | 40 | 5 | 55 | 0 | 0 | N/A | 48.59 | 84.42 | 9.65 | 91.19 |
| Ex. 1 | 40 | 5 | 38.5 | 0 | 16.5 | 2.3 | 55.56 | 84.19 | 12.13 | 91.44 |
| Ex. 2 | 40 | 5 | 27.5 | 0 | 27.5 | 1 | 61.38 | 83.51 | 12.88 | 90.44 |
| Ex. 3 | 40 | 5 | 0 | 27.5 | 27.5 | 1 | 57.08 | 83.12 | 11.28 | 89.7 |

TABLE 8

Green Formulations as a Function of Mixing Method and Ratio of Oil/PIB

| | Pigment Green 7 | Solsperse ™ 11000 Surfactant | Red Canola Oil | Solplus ™ PB420 PIB | Oil/PIB Ratio | % Opacity | L* (CWF) | a* (CWF) | b* (CWF) |
|---|---|---|---|---|---|---|---|---|---|
| Comp. Ex. B (HSD) | 20 | 5 | 75 | 0 | N/A | 41.69 | 41.84 | −33.29 | 2.29 |
| Ex. 4 (HSD) | 20 | 5 | 37.5 | 37.5 | 1 | 59.98 | 32.97 | −18.42 | −1.16 |
| Comp. Ex. C (Mill) | 20 | 5 | 75 | 0 | N/A | 48.16 | 36.6 | −26.26 | 0.71 |

TABLE 8

Green Formulations as a Function of Mixing Method and Ratio of Oil/PIB

| | Pigment Green 7 | Solsperse ™ 11000 Surfactant | Red Canola Oil | Solplus ™ PB420 PIB | Oil/PIB Ratio | % Opacity | L* (CWF) | a* (CWF) | b* (CWF) |
|---|---|---|---|---|---|---|---|---|---|
| Ex. 5 (Mill) | 20 | 5 | 37.5 | 37.5 | 1 | 69.69 | 33.19 | −18.56 | −1.03 |

TABLE 9

Blue Formulations as a Function of Mixing Method and Ratio of Oil/PIB

| | Pigment Blue 15:3 | Solsperse ™ 11000 Surfactant | Red Canola Oil | Solplus ™ PB420 PIB | Oil/PIB Ratio | % Opacity | L* (CWF) | a* (CWF) | b* (CWF) |
|---|---|---|---|---|---|---|---|---|---|
| Comp. Ex. D (HSD) | 20 | 5 | 75 | 0 | N/A | 62.42 | 32.29 | 0.11 | −40.11 |
| Ex. 6 (HSD) | 20 | 5 | 37.5 | 37.5 | 1 | 72.64 | 30.28 | 2.61 | −32.77 |
| Comp. Ex. E (Mill) | 20 | 5 | 75 | 0 | N/A | 58.5 | 33.37 | −0.83 | −41.54 |
| Ex. 7 (Mill) | 20 | 5 | 37.5 | 37.5 | 1 | 72.88 | 30.4 | 2.52 | −33.06 |

TABLE 10

Blue Formulations as a Function of Mixing Method and Ratio of Oil/PIB

| | Pigment Blue 15:1 | Solsperse ™ 11000 Surfactant | Red Canola Oil | Solplus ™ PB420 PIB | Oil/PIB Ratio | % Opacity | L* (CWF) | a* (CWF) | b* (CWF) |
|---|---|---|---|---|---|---|---|---|---|
| Comp. Ex. F (HSD) | 20 | 5 | 75 | | N/A | 57.07 | 35.01 | −0.49 | −46.27 |
| Ex. 8 (HSD) | 20 | 5 | 37.5 | 37.5 | 1 | 69.2 | 30.68 | 3.01 | −36.25 |
| Comp. Ex. G (Mill) | 20 | 5 | 75 | | N/A | 57.46 | 34.67 | −0.05 | −45.78 |
| Ex. 9 (Mill) | 20 | 5 | 37.5 | 37.5 | 1 | 69.85 | 30.93 | 2.85 | −37.19 |

TABLE 11

Blue Formulations as a Function of Mixing Method and Ratio of Oil/PIB

| | Pigment Blue 15:4 | Solsperse ™ 11000 Surfactant | Red Canola Oil | Solplus ™ PB420 PIB | Oil/PIB Ratio | % Opacity | L* (CWF) | a* (CWF) | b* (CWF) |
|---|---|---|---|---|---|---|---|---|---|
| Comp. Ex. H (HSD) | 20 | 5 | 75 | 0 | N/A | 61.21 | 33.75 | −0.63 | −41.94 |
| Ex. 10 (HSD) | 20 | 5 | 37.5 | 37.5 | 1 | 76.97 | 29.84 | 3.52 | −32.09 |
| Comp. Ex. I (Mill) | 20 | 5 | 75 | 0 | N/A | 63.12 | 33.57 | −0.08 | −40.73 |
| Ex. 11 (Mill) | 20 | 5 | 37.5 | 37.5 | 1 | 75.32 | 30.35 | 3.33 | −32.19 |

Table 12 reports the formulation of Example 12, which is suitable for commercial usage as a liquid color concentrate benefitting from the use of PIB as a colorant dispersing agent. The sum of the Oil and the PIB constituted 33.43 weight percent of the concentrate, and the Oil:PIB ratio was 1.96:1.

TABLE 12

| Component | Wt. Percent |
| --- | --- |
| 810600 RED CANOLA OIL | 22.1355 |
| Solplus ™ PB420 PIB | 11.2915 |
| SOLSPERSE 21000 Surfactant | 2.05 |
| TIONA 595 Titanium Dioxide (Cristal) | 59.913 |
| EP-62C ULTRAMARINE BLUE (Nubiola) | 0.4 |
| B-100 BLACK IRON OXIDE (Nubiola) | 0.207 |
| CALCIUM CARBONATE | 4.003 |

The 12 Examples and the 9 Comparative Examples provide to a person having ordinary skill in the art the guidance to utilize PIB as a polymeric colorant dispersing agent to not only improve throughput processing during high speed final article shaping but also improve the percentage opacity and dispersion of colorant in the final polymer article, regardless whether that final shape is produced by extrusion blow molding or thermoforming or calendering, etc. Without undue experimentation, the Examples and Comparative Examples offer the results of varying a number of factors important to improved processing and performance.

Polymers benefitting from liquid color concentrates of the invention include polyolefins. Of the polyolefins, both polyethylene grades and polypropylene grades can benefit. For the disclosure BMHDPE was chosen because of the difficulty of high speed, well dispersed coloration. But LLDPE, LDPE, HDPE, and any other polyethylene grade is a candidate for liquid color concentrate addition. Likewise, polypropylene homopolymers and copolymers can benefit from use of this invention.

Polyisobutylene is commercially available in a number of weight average molecular weights. As explained above, the Mw for PIB in this invention can be greater than 1000 daltons and can range from about 1200 daltons to about 6000 daltons, desirably 1500 daltons to about 6000 daltons, more desirably from about 2000 daltons to about 5000 daltons, preferably from about 3000 daltons to about 4500 daltons. All experiments above used PIB having a Mw of about 4200 daltons because that PIB grade was conveniently, commercially available.

The ratio between the Oil and the PIB is another factor. The Oil:PIB ratio can range from about 19:1 to about 1:3, desirably from about 3:1 to about 1:1 and preferably from about 2.3:1 to about 1:1.

For direct comparison purposes, except Example 12, the formulations used in the Examples and Comparative Examples did not explore a wide variety of colorants. Suffice to state that the inventive formulations contemplate the use of any inorganic-based pigment as a colorant in a weight percent in the liquid color concentrate ranging from about 0.50 to about 80 weight percent and preferably from about 50 to about 75 weight percent of the concentrate.

Also the Examples did not include other types of functional additives which are optional but often present in liquid color concentrate formulations. Non-limiting examples of such optional functional additives are mica special effects, UV stabilizers (such as Irganox 1010 (BASF) and Tinuvin 765 (BASF)), UV absorbers (such as Tinuvin 326 (BASF)), process stabilizers (Irganox 168 (BASF)), slip additives (erucamide and oleamide (a variety of sources)) can be added to the PIB blends.

Once the liquid color concentrate is formulated, it is added to the desired polymer in a delivery called a "let down ratio" by dosing apparatus associated with the polymer shaping equipment. For liquid color concentrates of this invention, the let down ratio can range from about 0.05 to about 5% and preferably from about 0.3% to about 2.5%.

Polymer articles finally shaped by any of the methods known in the art can be used in any number of industries, especially in appliance, building and construction, consumer goods, electrical and electronic items, healthcare, packaging, textiles, transportation, and wire and cable. The use of any of the possible polyolefin grades commercially available now or in the future will benefit from tailoring of type of oil, ratio of oil to PIB, screw speed, weight percent of liquid color concentrate, and other factors identified in this disclosure.

The invention is not limited to the above disclosure. The claims follow.

What is claimed is:
1. A liquid color concentrate, comprising:
   (a) colorant;
   (b) a low viscosity liquid diluent, wherein the low viscosity liquid diluent is red canola oil having a Brookfield viscosity (sp #6; 20 rpm; 20° C.) of about 150 cps; and
   (c) polymeric colorant dispersing agent, wherein the polymeric colorant dispersing agent is polyisobutylene having a weight average molecular weight (Mw) of greater than 1000 daltons;
   wherein the diluent and the dispersing agent are present in the concentrate in a weight ratio of about 1:1.
2. The liquid color concentrate according to claim 1, wherein the colorant comprises a pigment.
3. The liquid color concentrate according to claim 1, wherein the Mw of the polymeric colorant dispersing agent ranges from about 1200 to about 6000 daltons.
4. A colored polymer compound, comprising:
   (a) a polymeric resin; and
   (b) the liquid color concentrate of claim 1.
5. The colored polymer compound of claim 4, wherein the polymeric resin is a polyolefin.

* * * * *